(12) United States Patent
Agarwal et al.

(10) Patent No.: US 10,341,453 B2
(45) Date of Patent: Jul. 2, 2019

(54) FACILITATING IN-NETWORK CONTENT CACHING WITH A CENTRALLY COORDINATED DATA PLANE

(71) Applicant: Meru Networks, Sunnyvale, CA (US)

(72) Inventors: Saurabh Kumar Agarwal, Bengaluru (IN); Lakshmi Narayana Dronadula, Karnataka (IN)

(73) Assignee: Fortinet, Inc., Sunnyvale, CA (US)

( * ) Notice: Subject to any disclaimer, the term of this patent is extended or adjusted under 35 U.S.C. 154(b) by 96 days.

(21) Appl. No.: 14/811,818

(22) Filed: Jul. 28, 2015

(65) Prior Publication Data
US 2017/0034298 A1  Feb. 2, 2017

(51) Int. Cl.
*H04L 12/24* (2006.01)
*H04L 12/26* (2006.01)
*H04L 29/08* (2006.01)

(52) U.S. Cl.
CPC .......... *H04L 67/2842* (2013.01); *H04L 41/20* (2013.01); *H04L 43/00* (2013.01); *H04L 43/028* (2013.01)

(58) Field of Classification Search
CPC ....... H04L 41/20; H04L 43/00; H04L 43/028; H04L 67/02; H04L 67/1097; H04L 67/28; H04L 67/2819; H04L 67/2842; H04L 67/2852
See application file for complete search history.

(56) References Cited

U.S. PATENT DOCUMENTS

| | | | | |
|---|---|---|---|---|
| 6,205,481 B1* | 3/2001 | Heddaya | ............. | G06F 12/0813 707/E17.12 |
| 2007/0058629 A1* | 3/2007 | Luft | ........................ | H04L 67/42 370/390 |
| 2012/0102226 A1* | 4/2012 | Hopmann | ........... | H04L 12/6418 709/241 |
| 2013/0166720 A1* | 6/2013 | Takashima | .............. | H04L 41/00 709/223 |
| 2014/0173018 A1* | 6/2014 | Westphal | ............ | H04L 41/0823 709/213 |

* cited by examiner

*Primary Examiner* — Christopher Biagini
(74) *Attorney, Agent, or Firm* — Law Office of Dorian Cartwright; Dorian Cartwright (57) ABSTRACT

Facilitating content caching in a local network by using software-defined network (SDN) controller to centrally coordinate data plane behavior. One or more packets forwarded from a component of the plurality of network components is received because no flow has been installed at the component to instruct on how to handle the one or more packets. Responsive to a deep packet inspection identifying a request for external content, a caching server is queried on the local network to determine if the requested content is available locally. A response is received from the caching server that the requested content is not available, and in response, a first flow is installed within the local network to route copies of response packets associated with the requested content to the station. A second flow is installed within the local network to route copies of response packets associated with the requested content to the caching server. A third flow routes subsequent requests for the same content.

10 Claims, 8 Drawing Sheets

FACILITATING IN-NETWORK CONTENT CACHING WITH A CENTRALLY COORDINATED DATA PLANE

FIELD OF THE INVENTION

The invention relates generally to computer networking, and more specifically, to using software-defined networking (SDN) for caching within a local network.

BACKGROUND

The number of mobile devices and IoT (Internet of Things) devices connecting to enterprise networks has continually increased. These networks are hybrid in nature in that some aspects of the network are wireless operating under standards such as IEEE 802.11 (promulgated by the Institute of Electrical and Electronics Engineers), and other aspects of the network are wired operating under standards such as IEEE 802.3. Management and efficient operations of enterprise networks is therefore limited.

Moreover, many content files are repeatedly downloaded to devices on the enterprise network, leading to further inefficiencies. For example, consider a university campus hosting a large number of iPhones by Apple Inc. of Cupertino, Calif. When an update to iOS is released, there can be hundreds of concurrent and staggered downloads as students access the update. Problematically, a university network can become strained by the high volume of data transfers to the point that both downloaders and other network users experience a low quality of service. Coupled with heterogeneous network architectures that can include a mix of wired and wireless communication channels, and components of different vendors, traditional file caching is limited by choke points having a lack of interoperability.

What is needed is a robust technique to manage local caching or downloaded files over the modern network infrastructure.

SUMMARY

These shortcomings are addressed by the present disclosure of methods, computer program products, and systems for facilitating content caching in a local network by using software-defined network (SDN) controller to centrally coordinate data plane behavior.

In one embodiment, data plane traffic flow is centrally monitored by an SDN controller being API (application programming interface) -compatible with each of a plurality of network components distributed around a communication network. A control plane can remain under control of the network component. The communication network can be a hybrid of both wireless and wired components, and can include a Wi-Fi controller to separately manage Wi-Fi functions. One or more packets forwarded from a component of the plurality of network components is received because no flow has been installed at the component to instruct on how to handle the one or more packets.

In another embodiment, deep packet inspection is performed on the one or more packets to identify whether a request for content is being made to a location external to the local network. Responsive to identifying a request for external content, a caching server is queried on the local network to determine if the requested content is available locally. A response is received from the caching server that the requested content is not available, and in response, a first flow is installed within the local network to route copies of response packets associated with the requested content to the station. In another embodiment, a second flow is installed within the local network to route copies of response packets associated with the requested content to the caching server.

The SDN controller (and a Wi-Fi controller) can optionally be cloud-based. Physically, the SDN controller can be a stand-alone device or group of devices or be integrated with the Wi-Fi controller. In one embodiment, the SDN controller installs flows using Open Flow rules which are vendor-independent and set up in one or more of the Wi-Fi controller, an access point, and an access switch.

Advantageously, network performance is improved with higher end-to-end throughput through a centrally managed control plane with interoperability, reduced hops for network traffic, and network congestion is avoided, among other advantages. One technology, SDN, is used to improve other technologies, wireless networking and local caching. Further, the operation of computers themselves are improved by lowering the processor usage and usage of other resources with reduced network loads.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for using software-defined networking (SDN) for caching within a local network through the data plane. At a high-level, an SDN controller installs flows on the data plane to cache content retrieved by stations from external resources. One of ordinary skill in the art will recognize that many other scenarios are possible, as discussed in more detail below.

Systems to Facilitate in-Network Caching Using SDN (FIGS. 1-5)

Figure 1:
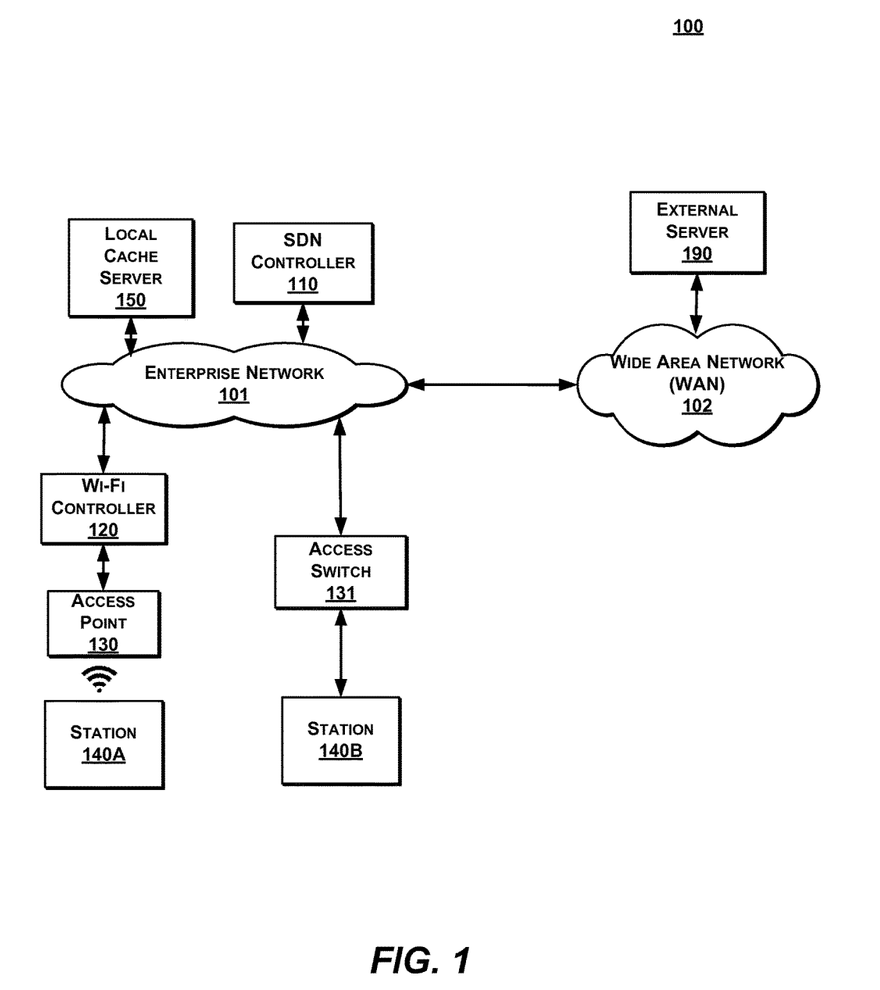
FIG. 1 is a high-level block diagram illustrating a system to facilitate local network caching of externally available content from a centrally managed data plane, according to one embodiment.

FIG. 1 is a high-level block diagram illustrating a system 100 to cache externally available content within a local network through the data plane, according to one embodiment. The system 100 comprises an enterprise (local) network 101 and wide area (external) network (WAN) 102 coupled by any communication channel such as a gateway enabled connection, a switch, a router, a plurality of individual connections between local components and external component, or the like. Components coupled to the enterprise network 101 comprises an SDN controller 110, a Wi-Fi controller 120, an access point 130, an access switch 131, stations 140A, B and local cache serer 150. An external database 190 is coupled to the WAN 102. Other embodiments of the system 100 are possible, including a controller that is cloud-based (e.g., located on the WAN 102). Further, components can be combined (e.g., the SDN controller 110 and the Wi-Fi controller 120) or separated (e.g., the Local cache server 150 can represent multiple devices). Additional network components can also be part of the system 100, such as firewalls (e.g., virus scanners, routers, switches, application servers, databases, as well as additional controllers, access points, access switches, stations, and the like. The network components can be implemented as hardware, software, or a combination of both.

Embodiments of the system 100 can be implemented in conjunction with a network security system, for example, the FortiGate Network Security platform by Fortinet of Sunnyvale, Calif. In more detail, flows installed by the SDN controller 110 as discussed herein, can be installed at a firewall as part of downloading files from external resources. One flow can provide layer 2 routing for sending frames associated with the file download to an access point.

The enterprise network 101 can serve, for example, a business enterprise, a hospital or system of hospital, school, building, a private network, or the like. A combination of wired and wireless devices can be connected, as well as only wireless devices or only wired devices. The WAN 102 can be, for example, the Internet, a cellular network, or even a large enterprise network to which the enterprise network 101 is a smaller component of. In a preferred embodiment, the station 140A is coupled to the access point 130 over a wireless channel, while the station 140B is coupled to the access switch 131 over a wired channel. The access point 130 can be coupled to the Wi-Fi controller 120 for access to the enterprise network 101. The access switch 131 is coupled directly to the enterprise network 101 in this embodiment, but in other embodiments can have connections to another switch, router, or gateway device. The SDN controller 110 and the local cache server 150 are also directly connected to the enterprise network 101. In turn, the enterprise network 101 can be connected to the WAN 102 to which the external server 190 connects. Components can be directly connected or communicatively coupled through a network, despite the example of FIG. 1. Components can use communication protocols such as IEEE 802.11, IEEE 802.3, Bluetooth, 3G and 4G.

The local cache server 150 provides local storage on the enterprise network 101 which may be accessed faster than external resources for repeated downloads, leading to less congestion and more network efficiency. For example, external files downloaded from the external server 190 responsive to a first request can be downloaded from the local cache server 150 responsive to a second or other subsequent request. Flow paths to and from the local cache server 150 are set by OpenFlow rules, as discussed in more detail with the other components. More generally, an index or table of one embodiment can be local and the back end storage devices can be located on the external network 102. The local cache server 150 can be one device or many devices. Devices can be dedicated to storage or provide many services. Any appropriate storage technologies can be implemented, including SAN (Storage Attached Network), NAS (Network Attached Storage), and the like. Similarly characteristics can be applied to the external database 190, although located on the external network 120.

The external server 190 is representative of any physical or virtual resource located external to the enterprise network 101. External files stored therein can be general data files, or specific files for a streaming application or software as a service (SaaS), MP3s or other multimedia content, query responses for data base searches, search engine results, video games, software version updates, PDF files, HTML code for web pages, or any other appropriate type of file.

The SDN controller 110 installs flows on the data plane to make local copies of externally accessed content, in one embodiment. Content requests are received by the SDN controller 110 addressed to an external resource such as the external database 190 from either the Wi-Fi controller 120, the access point 130, or in some cases, directly from stations 140A, B. In one embodiment, the SDN controller 110 performs deep packet inspection, pattern recognition, or other appropriate recognition technologies to identify content requests from the stations 140A, B. A file index is maintained or checked within the local cache server 150 to quickly query for locally stored files. When specific data is first requested, the SDN controller 110 will receive a cache miss from the local cache server 150. In response, a first data flow is installed on the data plane to facilitate handling of responsive packets sent back from the external database 190. Additionally, a second data flow can be installed on the data plane to generate copies of the responsive packet for storage of the specific data in the local cache server 150. When the same specific data is requested subsequent to the cache miss, a third data flow is installed on the data plane to facilitate handling of responsive packets sent back from the local server cache which stores a local copy of the requested content. The data flows can be configured using OpenFlow rules or actions (e.g., PACKET_IN, FLOW_MOD, or OUTPUT_PORT), or any other appropriate protocol.

In one example, the SDN controller 110 installs data flows on the Wi-Fi controller 120 for specific packet types. As a result, future packets of the same packet type can be processed without forwarding again to the SDN controller 110. In another example, the SDN controller 110 installs the data flows at the access point 130, so that subsequent packets of the same type can be processed at the access point 130 without further forwarding. In still another example, flows are installed at station 140. In yet other examples, the SDN controller 110 installs flows at multiple components. Furthermore, other embodiments can include a single flow or more than two flows to implement the disclosed functionality. More detailed data flows are show and discussed below relative to FIG. 2.

More generally, the SDN controller 110 centralizes data plane decision-making for the access point 130, the Wi-Fi controller 120 and/or other components such as switches, routers, hubs and gateways. To do so, components are configured to concede layer 2 routing decisions to the SDN controller 110 by forwarding packets to the SDN controller 110 for routing instructions. The SDN controller 110 can use input gathered across the network to make layer 2 routing decisions for the packets from a centralized perspective. The decisions are communicated back to the components. In one embodiment, routing decisions are made as a reaction to new or unknown flows. In another embodiment, access points are pre-configured by the SDN controller 110 with rules for automatically implementing SDN controller 110 decisions on matching packets in the future. In still another embodiment, the rules or policies are distributed to the other network devices along a routing path for multi-hop data plane control. OpenFlow rules bring compatibility to network components of different vendors. Consequently, the SDN controller 110 provides an end-to-end perspective of a heterogeneous environment that crosses wired and wireless networks consisting of components from multiple vendors.

Figure 8:
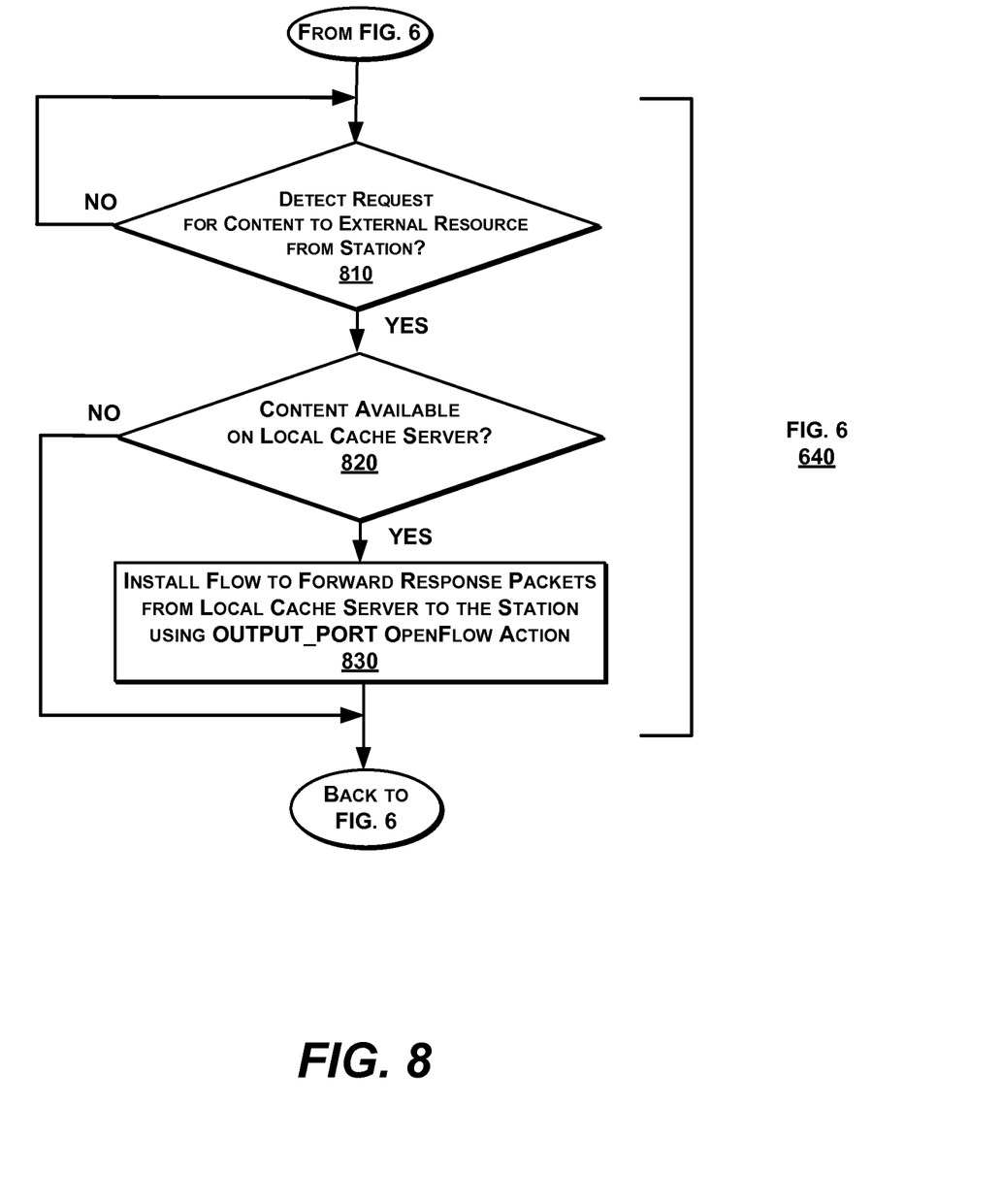
FIG. 8 is a more detailed flow diagram illustrating the step 640 of installing flows to route subsequent requests for the specific data from cache for the method of FIG. 6, according to one embodiment.
Figure 9:
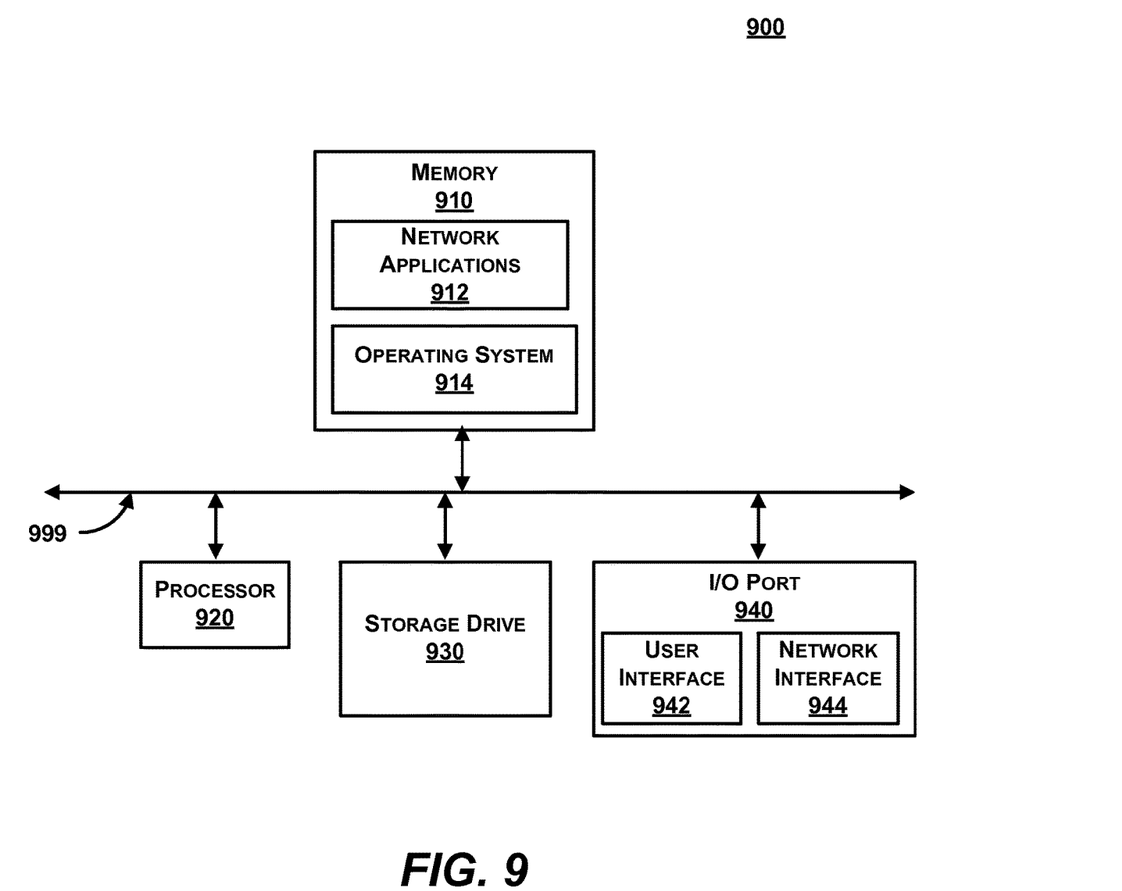
FIG. 9 is a block diagram illustrating an exemplary computing device, according to one embodiment.

The SDN controller 110 can be, for example, a personal computer, a laptop computer, a server, a cloud-based device, a virtual device, or the like implemented in any of the computing devices discussed herein (e.g., see FIG. 9). In one embodiment, the SDN controller 110 is located external to the enterprise network 101. In another embodiment, the SDN controller 110 is provided by a third party as a virtualized service. Additional embodiments of the SDN controller 110 are discussed with respect to FIG. 3 and more processes therein are described in FIGS. 6-8.

Returning to the components FIG. 1, a tunnel mode embodiment of the Wi-Fi controller 120 exchanges packets from the access point 130 and other access points with the SDN controller 110 (or other components) when checking for cache hits, when downloading locally cached files, and when downloading external files. OpenFlow rules can be established in the Wi-Fi controller 120 (or the access point 130 or the access switch 131) for example by the SDN controller 110. In particular, a layer 2 rule for forwarding cache interrogatories to the SDN controller 110 can be set. Another layer 2 rule can be for sending local cache files from the local cache server 150 to the station 140A or other stations can be set. Yet another layer 2 rule can forward external files from the external server 190, and a complimentary layer 2 rule can forward copies of external files to the local cache server 150. In a bridge mode embodiment of the Wi-Fi controller 120, communications are sent directly from the access point 130 to a destination without tunneling through the Wi-Fi controller 120. In this case, the Wi-Fi controller 120 manages behaviors of access points and stations without actually handling the packets to do so.

Other functionalities of the Wi-Fi controller 120 include communication with the access point 130 or group of access points to manage wireless connections to the stations while operating under IEEE protocols. Other control plane functions of the network can be directly affected while data plane functions are not directly affected by the Wi-Fi controller 120. In some embodiments, BSSIDs (Basic Service Set Identifiers) are managed from the Wi-Fi controller 120 to implement functionality such as seamless mobility for transparent handoffs of stations between access points all having a common BSSID. In other functionality such as virtual port, the Wi-Fi controller 120 coordinates a uniquely-assigned BSSID for each station in order to provide individualized management of stations connected at any access point.

Further, although the Wi-Fi controller 120 has some network-wide visibility, it is limited to Wi-Fi-relevant information for load balancing, managing a number of station connections across a group of access points, tracking BSSIDs, and the like. While the higher-layer decisions on the access point 130 can have some indirect impact on data plane decision making, the SDN controller 110 makes direct data plane decisions. The SDN controller 110 policies, as implemented, can override, co-exist, or compete with policies of the Wi-Fi controller 120 and the access point 130.

The Wi-Fi controller 120 can be implemented in any of the computing devices discussed herein (e.g., see FIG. 9). For example, the Wi-Fi controller 120 can be an MC1500 or MC6000 device by Meru Networks of Sunnyvale, Calif. In one embodiment, the SDN controller 110 and the Wi-Fi controller 120 are integrated into a single physical device. In another embodiment, information concerning network management is passed between the SDN controller 110 and the Wi-Fi controller 120. More embodiments of the Wi-Fi controller 120 are discussed with respect to FIG. 4.

The access point 130 exchanges packets for the station 140A over a wireless channel to a wired network. As discussed above, packets can be tunneled to the Wi-Fi controller 120 or directly forwarded while taking management instructions from the Wi-Fi controller 120 for Wi-Fi and IEEE 802 functions. In contrast to receiving Wi-Fi directions from the Wi-Fi controller 120, lower level, or layer 2 directions are received from the SDN controller 110 such as OpenFlow rules.

To provide network service to the station 140A, in one embodiment, the access point 130 complies with IEEE 802.11 protocols (promulgated by the Institute of Electrical and Electronics Engineers) to provide Wi-Fi service to the stations 140A, B over wireless communication channels 115A, B. Under IEEE 802.11, a beacon with one or more BSSIDs is periodically sent to advertise a presence for new connections and maintain current connections. Then the access point 130 listen for packets addressed to associated BSSIDs and ignore packets addressed to unassociated BSSIDs. Furthermore, the access point 130 forward packets addressed to MAC (Media Access Control) addresses of associated stations.

The access point 130 includes one or more individual access points implemented in any of the computing devices discussed herein (e.g., see FIG. 9). For example, the access point 130 can be an AP 110 or AP 433 (modified as discussed herein) by Meru Networks of Sunnyvale, Calif. A network administrator can strategically place the access point 130 for optimal coverage area over a locale. The access point 130 can, in turn, be connected to a wired hub, switch or router connected to the enterprise network 199 (or an external network). In embodiment, the access point 130 functionality is incorporated into a switch or router. The wired switch 140 can also be SDN-enabled.

The access switch 131 can be similar to the access point 130 except that a front end connection to the station 140B is over a wired medium. Still, the access switch 131 can operate under OpenFlow rules for layer 2 forwarding, copying, and the like. As can be seen, the specific architecture and types of connections can be modified within the spirit of the present invention.

The stations 140A, B can be, for example, a personal computer, a laptop computer, a tablet computer, a smart phone, a mobile computing device, a stationary computing device, a server, a cloud-based device, a virtual device, an Internet appliance, or any of the computing devices described herein (see e.g., FIG. 9). No special client is needed for this particular technique, although other aspects of the network may require downloads to the stations 140A, B. The stations 140A, B access to, for example, a LAN (local area network) or external networks using a RF (radio frequency) antenna and network software complying with IEEE 802.11.

Figure 2:
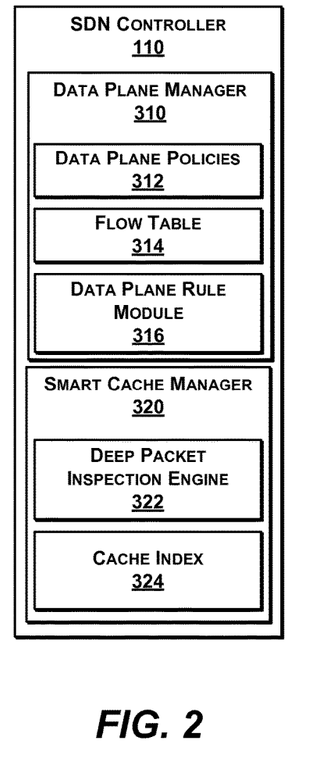
FIGS. 2-4 are more detailed block diagram illustrating an SDN (Self-Defined Networking) controller, a Wi-Fi controller, and an access point of the system of FIG. 1, respectively, according to some embodiments.

FIG. 2 is a more detailed block diagram illustrating the SDN controller 110 of the system 100, according to one embodiment. The SDN controller 110 comprises a data plane manager 310 and a smart cache manager 320. The components can be implemented in hardware, software, or a combination of both.

The data plane manager 310 centrally manages layer 2 routing decisions. The data plane manager 310 further comprises data plane policies 312 representing a database, table, or other description of policies stored locally, remotely, or distributed. As referred to herein, data plane policies are layer 2 routing decisions that are implemented outside of intelligent Wi-Fi flow policies. For example, a policy can drop or delay certain packets, or change a priority. The SDN controller can use input gathered across the network to make layer 2 routing decisions for the packets which are communicated back to the access points 130A and/or the access switch 131. In one embodiment, routing decisions are made as a reaction to new or unknown flows. In another embodiment, access points are pre-configured by the SDN controller 110 with rules for automatically implementing SDN controller 110 decisions on matching packets in the future. In still another embodiment, the rules or policies are distributed to the other network devices along a routing path for multi-hop data plane control.

A flow table 314 of the data plane manager 310 maintains a list of current and past flows affected by various policies. In some embodiments, the flow table is exported to other components along with OpenFlow rules. Generally, a flow as referred to herein comprises a series of packets between a common source address and destination address. Each flow can have individual sessions representing a file transfer, login through log off, opening through closing an application, and the like.

The data plane rule module 316 of the data plane manager 310 generates rules (e.g., OpenFlow rules, XML rules, source code, or proprietary commands) in real-time and in response to access point monitoring and/or deep packet inspection. The rules can set up a bridge, tear down a bridge, or implement other actions or settings. Additional modules can be added for other types of analysis and action. Some embodiments preconfigure network components with OpenFlow rules to treat content requests. For example, requests for external files can be profiled and layer 2 identification rules can be exposed to search locally for the file.

The smart cache manager 320 further comprises a deep packet inspection engine 322 and a cache index 324. Some embodiments implement the smart cache manager 320 as a separate, dedicated server. The deep packet inspection engine 322 can analyze the load portion of a packet, rather than just the metadata, in order to determine whether the packet is part of a content request from external resources. Even though the destination address can be ascertained from metadata, application layer data is not easily discernable. But the deep packet inspection engine 322 examines data within to identify patterns, digital fingerprints, data formats, and other unique characteristics of application data for comparison against a database (not illustrated) of preconfigured characteristics. In some embodiments, characteristics can be periodically updated. For example, if a particular file is being requested, the deep packet inspection engine 322 may recognize names of files or file extensions such as jpg, gif, pdf, doc, mp3, and the like. In some cases, the file extension may be preceded or followed by a specific pattern of data indicative of a request for that particular file. Furthermore, applications that retrieve data can be recognized, like Drop Box, iTunes, or Netflix. Deep packet inspection on packets can identify whether a request for content is being made by an application.

The cache index 324 maintains a list of data stored in the local cache server 150. After a cache miss, a copy of data may be stored locally, and listed in the cache index 324. The process allows subsequent requests for the same data to be recognized as being locally stored and, therefore, retrieved locally rather than externally.

Figure 3:
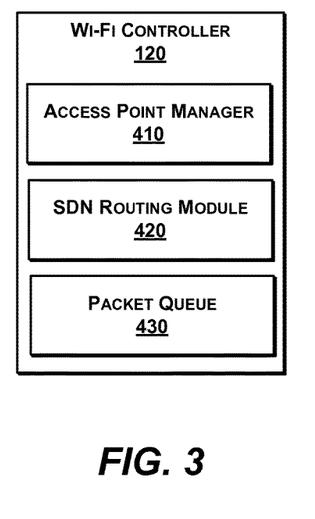

FIG. 3 is a more detailed block diagram illustrating the Wi-Fi controller 120 of the system 100 which comprises an access point manager 410, an SDN routing module 420 and a packet queue 430. The components can be implemented in hardware, software, or a combination of both. The access point manager 410 communicates with a group of access points for Wi-Fi functionality such as assigning BSSIDs and transferring stations between access points. Then SDN routing module 420 implements OpenFlow compatibility through an API compatibility with the SDN controller 110. In some embodiments, the SDN routing module 420 drops advertisements or queries rather than forwarding, depending on a specific configuration. Finally, a packet queue 430 stores packets that are being processed or are awaiting further instructions. In one embodiment, the Wi-Fi controller 120 holds packets until implementing OpenFlow rules handing dispatch of packets.

Figure 4:
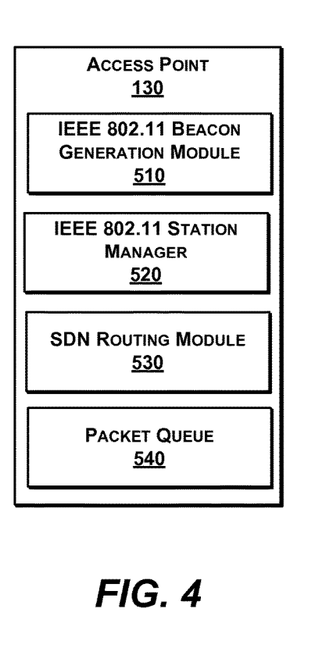

FIG. 4 is a more detailed block diagram illustrating the access point 130 of the system 100, according to one embodiment. The access point 130 comprises an IEEE 802.11 beacon generation module 510, an IEEE 802.11 station manager 520, an SDN routing module 530, and a packet queue 540. The components can be implemented in hardware, software, or a combination of both.

The IEEE 802.11 beacon generation module 510 generates beacons with embedded BSSIDs and parameters, according to IEEE 802.11 protocols. The IEEE 802.11 station manager 520 stores globally and/or locally-influenced parameter values, policy-based parameter values, manually configured parameter values, or the like. Wi-Fi status data related to a number of connected stations, usage data, and the like can be collected from the IEEE 802.11 beacon generation module 510 and the IEEE 802.11 station manager 320 for the SDN controller 110.

The SDN routing module 530 forwards packets and layer 2 information according to the SDN controller 110. The first few packets from new data streams can be sent to the SDN controller 110 for analysis. Alternatively, there may already be rules present that direct handling of the new data streams. Example statuses can be a download rate for a specific flow, queue capacity, routing statistics, and more. Periodic updates are made on a regular basis or responsive to change. Additionally, the SDN routing module 530 implements rules in OpenFlow or other formats. The packet queue 540 stores packets for flows until forwarded as instructed. The instructions can be a combination of Wi-Fi controller 120 instructions about which BSSID to use for messages and OpenFlow rules from the SDN controller 110 about routing, delays, priority or other layer 2 direction.

Figure 5A:
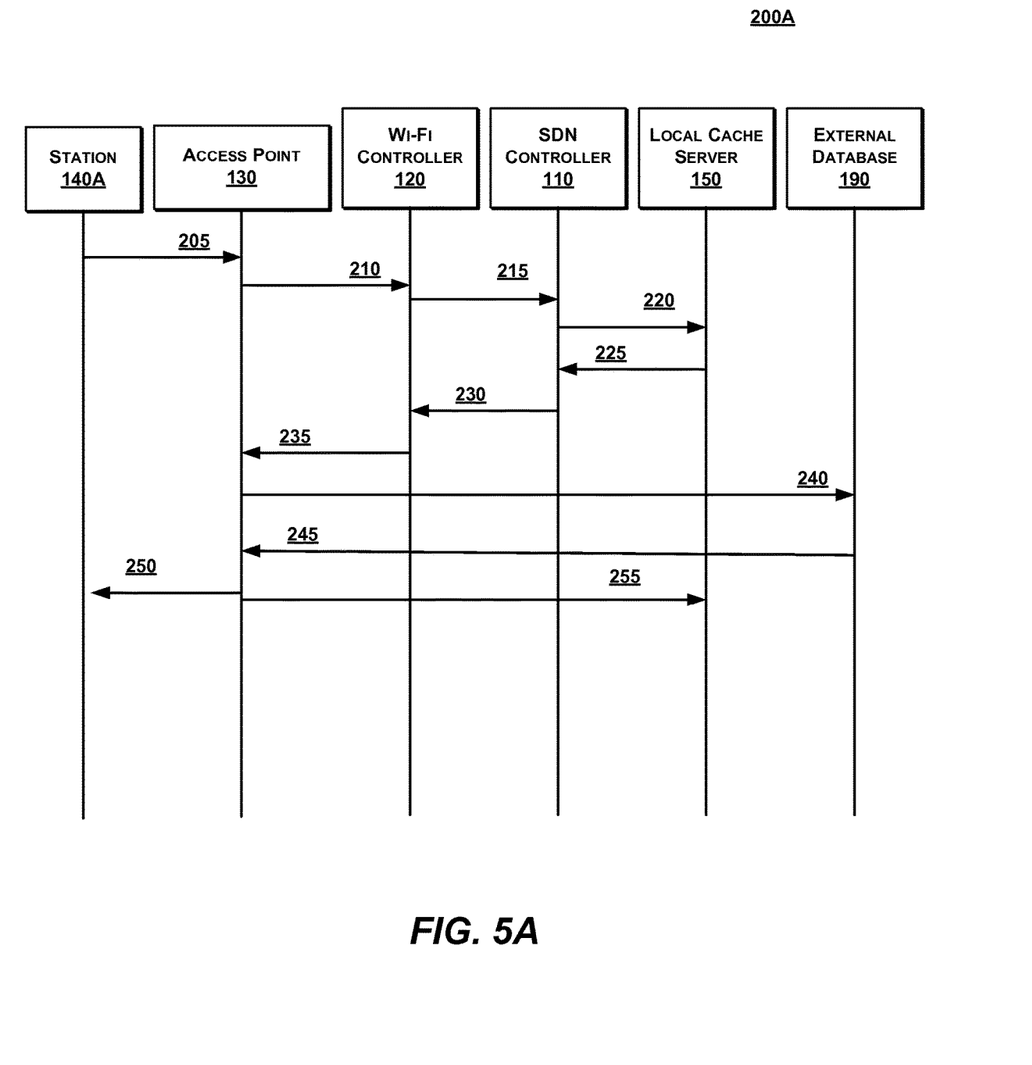
FIGS. 5A & 5B are sequence diagrams illustrating a series of interactions between the components of the system in FIG. 1 for a cache miss, and a cache hit, respectively, according to some embodiments.

FIG. 5A is a sequence diagram illustrating a series of interactions between the components for a cache miss in the system 100 in FIG. 1, according to some embodiments. The data path originates with content requests sent from the station 140A to the access point 130 (interaction 205) which, in one embodiment, tunnels packets to the Wi-Fi controller 120 (interaction 210), and finally, to the SDN controller 110 (interaction 215). The SDN controller 110 sends a query to the local cache server 150 based on the content requests (interaction 225) and receives a response from the local cache server (interaction 230). For a cache miss, the SDN controller 110 sends an OpenFlow rule to the Wi-Fi controller 110 and also sends a rule to the access point 130 through the Wi-Fi controller 120 (interaction 235). In turn, the access point 130 sends the content requests to the external database 190 as instructed by the flow rules. Packets sent from the external database 190 to the access point 130 in response to the content requests, are sent not only to the station (interaction 250), but also to the local cache server 150).

Figure 5B:
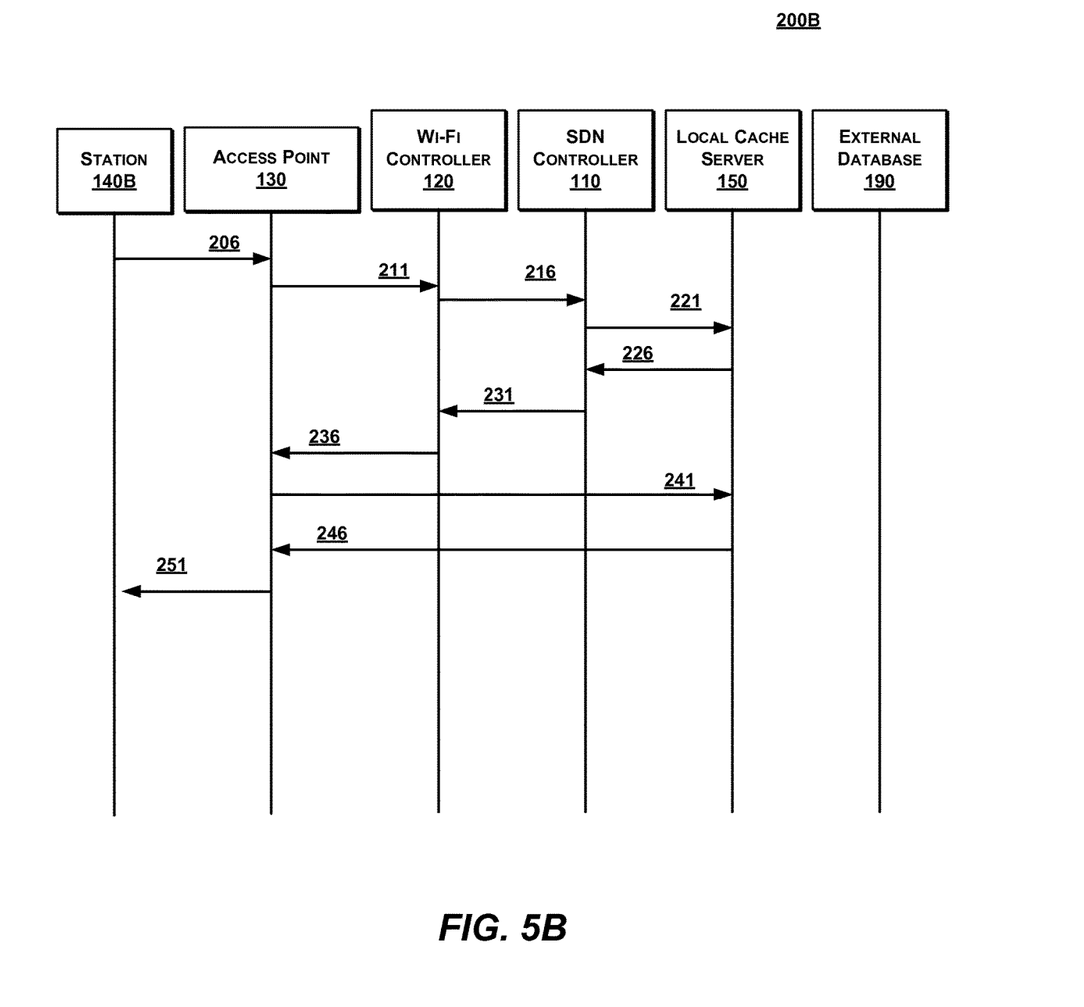

FIG. 5B is a sequence diagram illustrating a series of interactions between the components for a cache hit in the system 100 in FIG. 1, according to some embodiments. Similar to FIG. 2A, the data path originates with content requests sent from the station 140 to the access point 130 (interaction 206) and tunneling of packets to the Wi-Fi controller 120 (interaction 211), and then to the SDN controller 110 (interaction 216). This time, the SDN controller 110 sends a query to the local cache server 150 based on the content requests (interaction 226) and receives a cache hit response from the local cache server (interaction 231). In response, the SDN controller 110 sends a different OpenFlow rule to the Wi-Fi controller 110 and also sends a rule to the access point 130 through the Wi-Fi controller 120 (interaction 236). The rule directs the access point 130 to forward additional packets of the same type (i.e., for the same request) to the local cache server 150 (interaction 241) from which data is downloaded to the access point 130 (interaction 246) and station 140 (interaction 251). Note that no interaction with the external database 190 is necessary in some embodiments.

Figure 6:
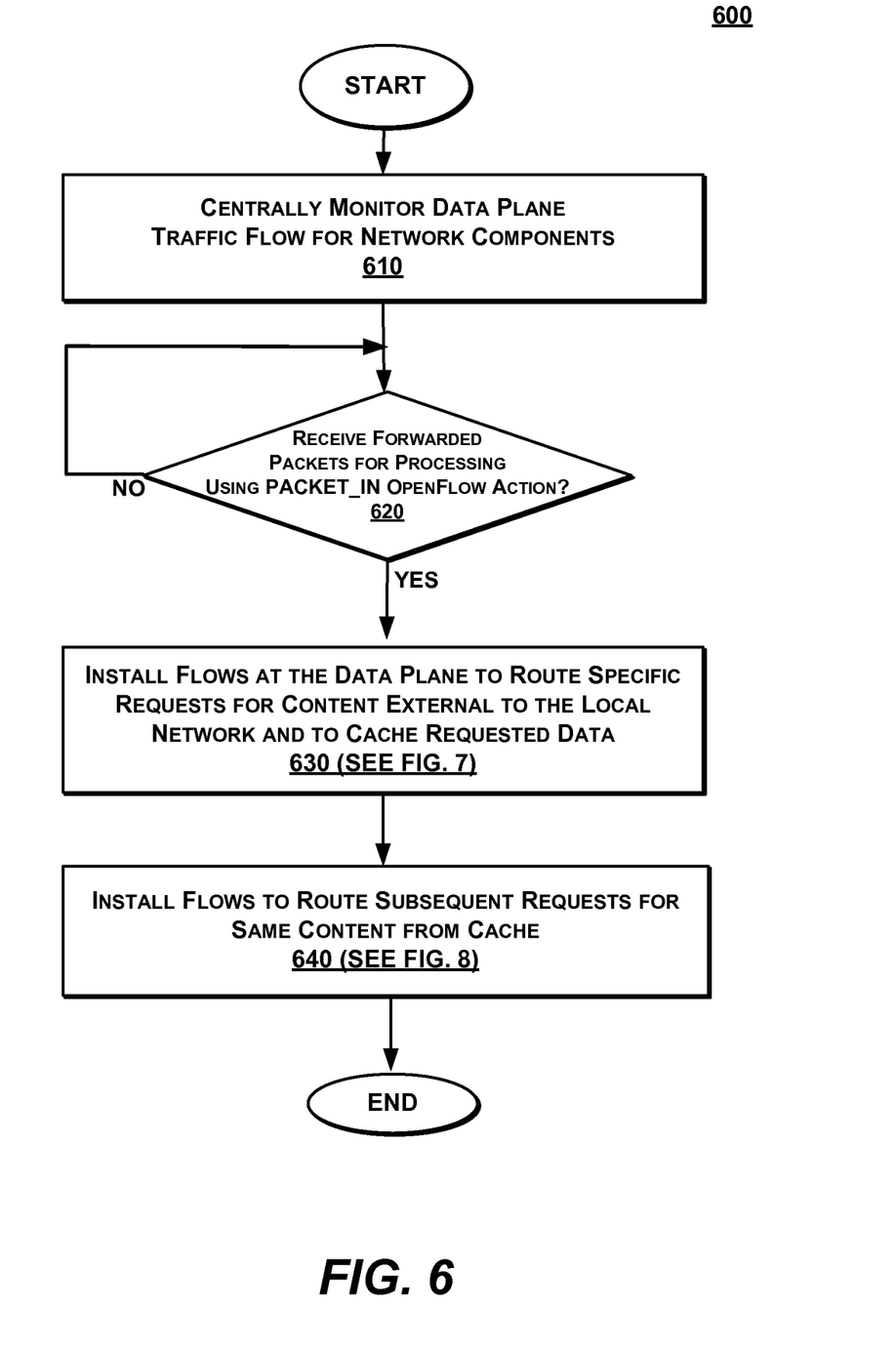
FIG. 6 is a high-level flow diagram illustrating a method for facilitating local network caching of externally available content from a centrally managed data plane, according to an embodiment.
Figure 7:
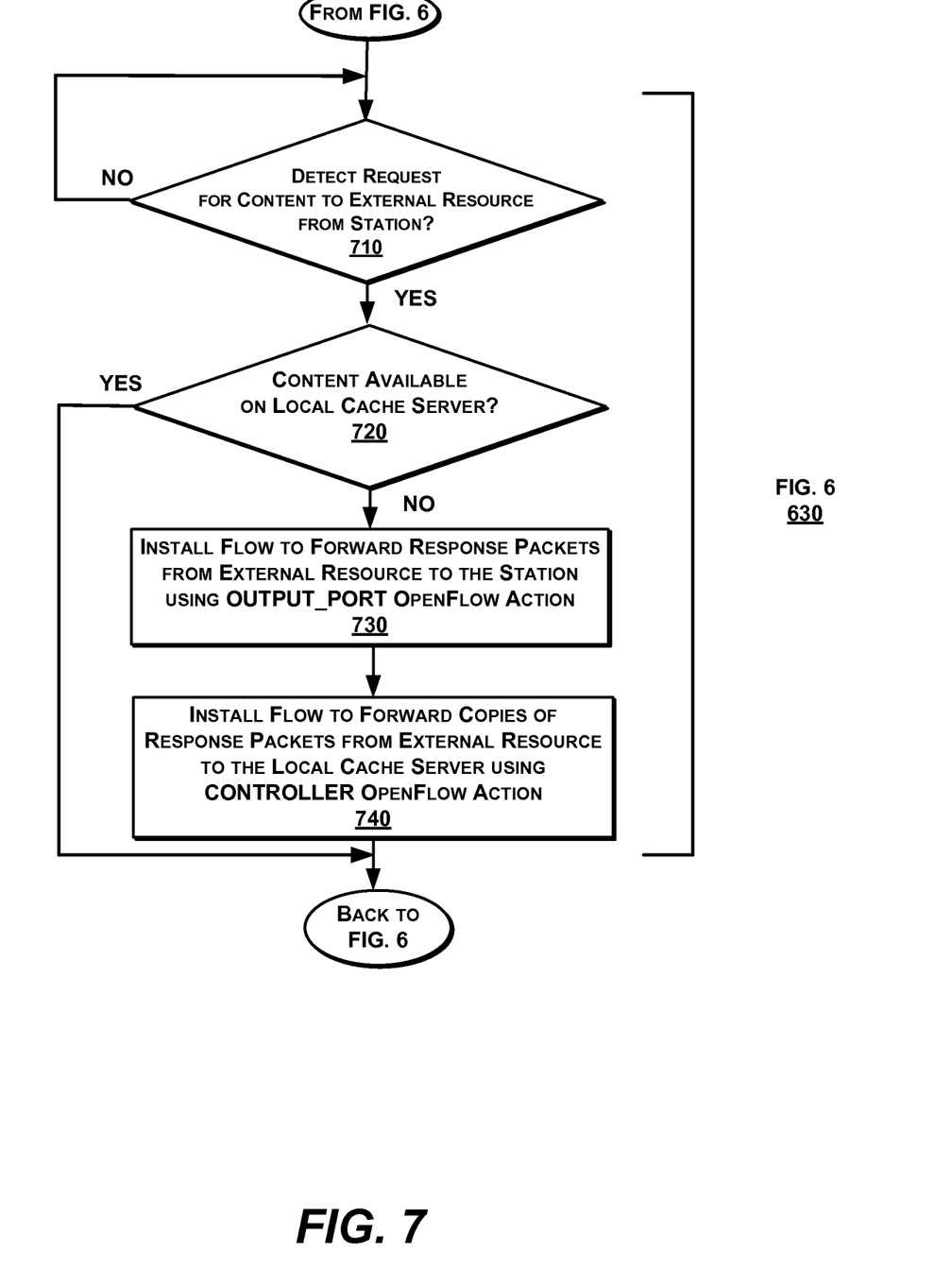
FIG. 7 is a more detailed flow diagram illustrating the step 630 of installing flows at the data plane to route specific requests for specific data external to the local network and to cache requested content for the method of FIG. 6, according to one embodiment.

Methods for Facilitating in-Network Caching Using SDN (FIG. 6-8)

FIG. 6 is a high-level flow diagram illustrating a method 600 for facilitating local network caching of externally available data from a centrally managed data plane, according to an embodiment. One of ordinary skill in the art will recognize that the method 600 is non-limiting as other embodiments can have more or less steps and can be performed in a different order. The method 600 can be implemented in the system 100 of FIG. 1 or in other components.

Traffic flow of the data plane is centrally monitored at the network components (step 610). Responsive to receiving packets forwarded for processing (step 620), flows are installed at the data plane to route requests for data external to the local network, and to cache the requested content (step 630), as detailed below in association with FIG. 7. Flows are installed to route content requests from a local cache upon receiving a subsequent request for the specific data (step 640), as described more fully below with respect to FIG. 8.

FIG. 7 is a more detailed flow diagram illustrating the step 630 of installing flows at the data plane to route specific requests for specific data external to the local network and to cache requested content for the method of FIG. 6, according to one embodiment.

When content requests for external resources from a station are detected (step 710), a local cache is checked to see if the specific data is requested (step 720). Responsive to a cache miss, flows are installed to forward response packets from external resources to the station (step 730). In an embodiment, an OUTPUT_PORT OpenFlow action sends packets from downstream components to an SDN controller. Flows are installed to forward copies of response packets from external resources to the local cache (step 740). In an embodiment, a CONTROLLER OpenFlow action sends copies of packets from downstream to an SDN controller for storage in a local cache server (or sends copies directly to a local cache server). Substantially equivalent instructions in OpenFlow or other protocols can also be implemented. Also, some embodiments have additional flows installed.

FIG. 8 is a more detailed flow diagram illustrating the step 640 of installing flows to route subsequent requests for the specific data from cache for the method of FIG. 6, according to one embodiment.

When content requests for external resources from a station are detected (step 810), a local cache is checked to see if the specific data is requested (step 820). Responsive to a cache hit, flows are installed to forward response packets from a local cache to the station (step 830). For example, an OUTPUT_PORT OpenFlow action is sent to the local cache and a FLOW_MOD OpenFlow action is sent to the access point and/or a Wi-Fi controller. Substantially equivalent instructions in OpenFlow or other protocols can also be implemented. Also, some embodiments have additional flows installed.

Generic Computing Device (FIG. 9)

FIG. 9 is a block diagram illustrating an exemplary computing device 900 for use in the system 100 of FIG. 1, according to one embodiment. The computing device 900 is an exemplary device that is implementable for each of the components of the system 100, including the SDN controller 110, the Wi-Fi controller 120, the access point 130, and the stations 140A, B. The computing device 900 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 900, of the present embodiment, includes a memory 910, a processor 920, a storage drive 930, and an I/O port 940. Each of the components is coupled for electronic communication via a bus 999. Communication can be digital and/or analog, and use any suitable protocol.

The memory 910 further comprises network applications 912 and an operating system 914. The network applications 912 can include the modules of the SDN controller 110, the Wi-Fi controller 120, or the access point 130, as illustrated in FIGS. 2-4. Other network applications 912 can include a web browser, a mobile application, an application that uses networking, a remote application executing locally, a network protocol application, a network management application, a network routing application, or the like.

The operating system 914 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 910 or the storage drive 930

The storage drive 930 can be any non-volatile type of storage such as a magnetic disc, EEPROM, Flash, or the like. The storage drive 930 stores code and data for applications.

The I/O port 940 further comprises a user interface 942 and a network interface 944. The user interface 942 can output to a display device and receive input from, for example, a keyboard. The network interface 944 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a software-defined networking (SDN) controller in a communication network for facilitating content caching in a local network by centrally coordinating layer 2 data plane behavior, the method comprising the steps of:

centrally monitoring layer 2 data plane traffic flow at each of a plurality of network components distributed around the communication network;

receiving one or more packets forwarded from a component of the plurality of network components, wherein the component forwards the one or more packets to the SDN controller when no flow has been installed at the component to instruct on how to handle the one or more packets;

performing deep packet inspection on the one or more packets to identify a request for content, and to identify whether a request for content is being made by a specific application, and to identify a location of the one or more packets external to the local network;

responsive to identifying a request for external content for the specific external content for the specific application, querying a caching server on the local network to determine if the requested content is available locally;

receiving a response from the caching server that the requested content is not available;

responsive to the requested content not being available on the local network:
  installing a first flow within the local network to route response packets associated with the requested content to a station corresponding to the component of the plurality of network components, and
  installing a second flow within the local network to route copies of response packets associated with the requested content to the caching server;

receiving a response from the caching server that the requested content is available; and responsive to the requested content being available on the local network, installing a third flow within the local network to route response packets associated with the requested content from the local cache server to the station and drop packets directed to the external content.

2. The method of claim 1, wherein the first and second flows are installed with $FLOW_{13}$ MOD OpenFlow actions.

3. The method of claim 1, wherein the first flow and the second flows comprise OpenFlow actions.

4. The method of claim 1, wherein the first flow comprises an $OUTPUT_{13}$ PORT action to forward the response packets to the station.

5. The method of claim 1, wherein the second flow comprises a CONTROLLER action to forward copies of the response packets to the SDN controller.

6. The method of claim 1, wherein the second flow comprises an OpenFlow action to forward copies of the response packets to the local cache server.

7. The method of claim 1, wherein the request for content is received from one of an access point, an access switch, or a Wi-Fi controller acting on behalf of a station.

8. The method of claim 1, wherein packets are forwarded to the SDN controller responsive to a $PACKET_{13}$ IN action.

9. A non-transitory computer-readable medium storing source code that, when executed by a processor, performs a method in a software-defined networking (SDN) controller in a wireless communication network for facilitating content caching in a local network by centrally coordinating data plane behavior, the method comprising the steps of:

centrally monitoring data plane traffic flow at each of a plurality of network components distributed around the communication network;

receiving one or more packets forwarded from a component of the plurality of network components, wherein the component forwards the one or more packets to the SDN controller when no flow has been installed at the component to instruct on how to handle the one or more packets;

performing deep packet inspection on the one or more packets to identify a request for content, and to identify whether a request for content is being made by a specific application, and to identify a location of the one or more packets external to the local network;

responsive to identifying a request for external content for the specific external content for the specific application, querying a caching server on the local network to determine if the requested content is available locally;

receiving a response from the caching server that the requested content is not available;

responsive to the requested content not being available on the local network:
    installing a first flow within the local network to route response packets associated with the requested content to a station corresponding to the component of the plurality of network components, and
    installing a second flow within the local network to route copies of response packets associated with the requested content to the caching server;

receiving a response from the caching server that the requested content is available; and responsive to the requested content being available on the local network, installing a third flow within the local network to route response packets associated with the requested content from the local cache server to the station and drop packets directed to the external content.

10. A software-defined networking (SDN) controller in a wireless communication network for facilitating content caching in a local network by centrally coordinating data plane behavior, the SDN controller comprising:
    a processor; and
    a memory, storing:
    a first module to centrally monitor data plane traffic flow at each of a plurality of network components distributed around the communication network;
    a second module to receive one or more packets forwarded from a component of the plurality of network components, wherein the component forwards the one or more packets to the SDN controller when no flow has been installed at the component to instruct on how to handle the one or more packets;
    a third module to perform deep packet inspection on the one or more packets to identify a request for content, and to identify whether a request for content is being made by a specific application, and to identify a location of the one or more packets external to the local network;
    a fourth module to, responsive to identifying a request for external content for the specific external content for the specific application, query a caching server on the local network to determine if the requested content is available locally;
    a fifth module to receive a response from the caching server that the requested content is not available;
    a sixth module to, responsive to the requested content not being available on the local network:
        install a first flow within the local network to route copies of response packets associated with the requested content to a station corresponding to the component of the plurality of network components, and
    install a second flow within the local network to route copies of response packets associated with the requested content to the caching server;
    a seventh module to receive a response from the caching server that the requested content is available; and
    an eight module to responsive to the requested content being available on the local network, installing a third flow within the local network to route response packets associated with the requested content from the local cache server to the station and drop packets directed to the external content.

* * * * *